(No Model.)

J. H. RAFFERTY.
HEAD CHECK LOOP.

No. 420,244. Patented Jan. 28, 1890.

WITNESSES:

INVENTOR:
J. H. Rafferty
BY Munn & Co.
ATTORNEYS.

UNITED STATES PATENT OFFICE.

JOHN H. RAFFERTY, OF WORCESTER, MASSACHUSETTS.

HEAD-CHECK LOOP.

SPECIFICATION forming part of Letters Patent No. 420,244, dated January 28, 1890.

Application filed May 1, 1889. Serial No. 309,205. (No model.)

*To all whom it may concern:*

Be it known that I, JOHN H. RAFFERTY, of Worcester, in the county of Worcester and State of Massachusetts, have invented a new and Improved Head-Check Loop, of which the following is a full, clear, and exact description.

My invention relates to a loop device adapted more especially to hold head-check-reins to the crown-strap of a harness-bridle, but adapted also for use as a driving-rein loop; and the invention has for its object to provide a simple, inexpensive, ornamental, and reliable loop of this character.

The invention consists in certain novel features of construction of the rein-loop, all as hereinafter described and claimed.

Reference is to be had to the accompanying drawings, forming a part of this specification, in which similar letters of reference indicate corresponding parts in all the views.

Figure 1:
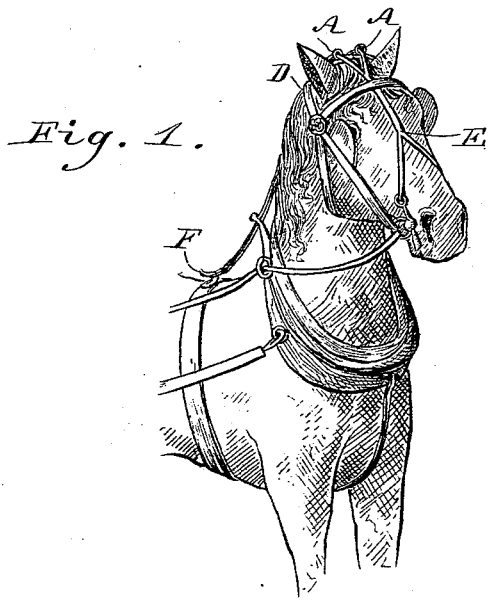
Figure 2:
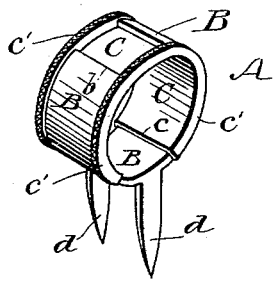
Figure 3:
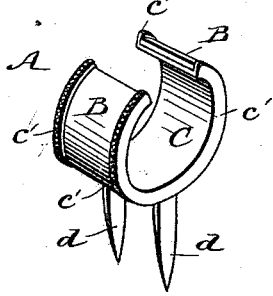

Figure 1 is a perspective view of the fore part of a horse and harness, and illustrates the use of my invention. Fig. 2 is a perspective view of one of the head-check loops in closed condition, and Fig. 3 shows one of the loops open ready to receive the checkrein.

The head-check loop A consists, mainly, of two open or partial rings B C, one fitted for rotation or partial rotation on or in the other. The ring B, having an opening $b$, is preferably provided opposite said opening with a pair of prongs $d\ d$, which are passed through the crown-strap D of a bridle and clinched at the under side or face of the strap; but I am not limited to the use of any particular means by which to attach the ring B or the head-check loop to the crown-strap, or to any other portion of a harness to which the loop is adapted for service as a rein loop or guide. For instance, I may use rivets to hold the ring to the strap or to a saddle.

I show the ring C, having an opening $c$ about the same size as the opening $b$ of the ring B, and held not too loosely within said ring by two side lips or flanges $c'\ c'$, which are upset about at right angles at each edge of the outer ring. These lips or flanges $c'$ preferably extend clear around the edges of the ring C, and are serrated at their peripheries or margins, which project a trifle beyond the outer face of the outer ring B, to allow the inner ring to be conveniently turned in the outer one. The openings $b\ c$ of the two rings are only wide enough to allow a checkrein—a rounded rein more especially—to be passed sidewise through them into the loop.

The operation of the device is very simple and effective, as follows: When the loop-ring C is turned upon the relatively-fixed ring B until the openings $c\ b$ of the two rings coincide, and as shown in Fig. 3 of the drawings, the two branches of the head-checkrein E will be slipped sidewise into the loops A A before the rein is engaged with the water-hook F, and the loop-rings C will then be turned to bring their openings $c$ lowermost, or out of register with the openings $b$ of the loop-rings B, and cause the rings C to close the openings $b$ of the rings B, as shown in Fig. 2 of the drawings, and thereby securely lock the head-checkrein to and within the loops.

The herein-described rein-loop may be made large enough to accommodate a flat checkrein, which it will hold quite as securely as a round rein; but I prefer to make the loops as small as practicable, and for use particularly with round reins, which will be not much smaller than the loops, which, while holding the checkrein securely against slipping out, will scarcely be noticeable on the harness, or will be very much smaller and more neat-looking than checkrein-loops of other pattern. The loops may be made of any suitable material, metal, either nickel or silver or gold plated, being preferred to give the loops a highly ornate finish.

I am aware that a key-ring has before been made of two flat split or open rings placed face to face within a third flanged ring, also split, to allow insertion of keys, and holding them when the slits of the rings are thrown out of register; but this device is quite impracticable for service as a check or driving rein loop, as its inner face or opening presents several more or less sharp transverse joint edges, across which a rein would draw to quickly wear and cut it. My loop is readily distinguishable from this key-ring device in that the inner face or opening of the loop is devoid of sharp edges, which would tend to cut the rein, and this would be the case were the ring B provided with inbent flanges at opposite edges of the ring C, if said flanges did not extend to the inner face or opening of the latter ring; but the construction with the flanges on the ring C, as shown and described, is preferred in practice.

Having thus described my invention, what I claim as new, and desire to secure by Letters Patent, is—

1. A head check or rein loop consisting of two open rings, one inclosing the other and fitted for rotation one on the other, and means for attaching it to a harness strap or saddle, the inner face of the loop over which the rein draws being continuous or unbroken transversely, substantially as described, whereby cutting of a rein confined in the loop is prevented, as set forth.

2. A head check or rein loop consisting of a ring B, open at $b$, and a ring C, open at $c$ and fitted loosely on the ring B, and provided with side lips or flanges overlapping the edges of it, and means for attaching the loop to a harness strap or saddle, substantially as herein set forth.

3. The combination, in a head check or rein loop, of a ring B, having an opening $b$ and attaching-prongs $d$, and a ring C, fitted loosely on the ring B and open at $c$, and provided with side lips or flanges overlapping the edges of the ring B, substantially as herein set forth.

JOHN H. RAFFERTY.

Witnesses:
F. A. ALDRICH,
B. G. CLAPP.